United States Patent [19]

Moore

[11] 4,004,474
[45] Jan. 25, 1977

[54] TORQUE TRANSMITTING ASSEMBLY

[75] Inventor: Stanley H. Moore, Coquitlam, Canada

[73] Assignee: Wescan Mining Trucks & Equipment Ltd., Vancouver, Canada

[22] Filed: Jan. 6, 1975

[21] Appl. No.: 538,775

[30] Foreign Application Priority Data

Oct. 1, 1974 Canada .............................. 210513

[52] U.S. Cl. .................................. 74/801; 74/785
[51] Int. Cl.² ......................................... F16H 1/28
[58] Field of Search ..................... 74/785, 801, 391

[56] References Cited

UNITED STATES PATENTS

| 2,724,266 | 11/1955 | Baker et al. | 74/801 X |
| 2,941,423 | 6/1960 | Armington et al. | 74/391 X |
| 3,434,374 | 3/1969 | Barwig | 74/801 |

FOREIGN PATENTS OR APPLICATIONS

| 1,214,517 | 1/1959 | France | 74/801 |
| 474,824 | 12/1913 | France | 74/391 |
| 737,886 | 7/1943 | Germany | 74/801 |

Primary Examiner—Benjamin W. Wyche
Assistant Examiner—Lance W. Chandler

[57] ABSTRACT

A torque transmitting assembly for a wheel drive train suitable for off-highway vehicles. The assembly includes an internal gear having first external gear means about its periphery and adapted to engage a number of driving pinion gears mounted within the internal gear. A separate, first cylindrical torque transmitting member has first internal gear means for engaging the first external gear means and also has second internal gear means. A second, generally cylindrical, torque transmitting member is provided with second external gear means adapted to engage the second internal gear means. The first torque transmitting member is adapted to be detachably connected to the internal gear member and to the second torque transmitting member respectively. In operation, driving torque is transmitted from the driving gears to the second torque transmitting member via the first transmitting member and the first and second internal and external gear means. Preferably, the first torque transmitting member forms a substantially unbroken cylindrical surface in an area between the first and second internal gear means.

18 Claims, 5 Drawing Figures

TORQUE TRANSMITTING ASSEMBLY

BACKGROUND OF THE INVENTION

This invention relates to a torque transmitting assembly for a wheel drive train and, in particular, an assembly suitable for the wheels of large, off-highway vehicles.

Large, off-highway trucks for mining and quarrying operations are of course well known and many of these trucks have capacities in excess of one hundred tons. These vehicles must often be able to negotiate steep inclines such as where they are used in open pit mines, these pits often being very deep indeed. Many of these large trucks utilize electric wheel drive systems mounted within the rear axle. Vehicles driven in this manner generally have two electrical propulsion systems, one located on each side of the axle with the central housing portion of the axle providing access for such features as the electrical circuitry. The primary power source of these trucks usually consists of a large internal combustion engine or the equivalent and this engine drives a large capacity electrical generator. Generally, a substantial gear reduction system is operatively connected between the electric motor for each rear wheel and the rear wheel is often a dual wheel.

Electrically or hydraulically propelled vehicles are more easily adapted to design configurations when the payload of such vehicles approaches and exceeds approximately one hundred tons. This is not to say that mechanical or equivalent drives are not utilized. Rather, within the usual basic design criteria, there are some space advantages in utilizing either electric or hydraulic propulsion means for such vehicles.

Presently, the large rear drive wheels of these vehicles which are driven by an electric motor in each wheel have a gear reduction system that includes a torque tube assembly for transmitting torque from the planetary gears of the system to the actual wheel. This known torque tube assembly has basically three components: namely, a ring gear (hereinafter called the internal gear member), a barrel or cylindrical member (hereinafter called the first torque transmitting member), and a base plate of generally cylindrical form (hereinafter called the second torque transmitting member). These three components of the known torque tube assembly are generally welded together for use in the overall wheel assembly.

The known torque tube assembly has a number of disadvantages primarily due to the fact that in its assembled state it comprises a single rigid, welded member. Any welding operation will of course cause distortions in the welded assembly because of the heat created during welding. Also, generally speaking, any welded assembly has geometric problems (such as cracks and undercutting), changes that have occurred in the heat affected zone, and the build up of residual stresses in the assembly. A further disadvantage of a one piece welded torque tube assembly as that the various components must be aligned and held very carefully when the welding procedure is being carried out. It will be appreciated that a torque tube assembly for a very large truck wheel will itself be of considerable size. Thus, a high degree of accuracy is required in the welding operation and on going processes must be used to produce the finished welded torque tube assembly in order to provide for relief of the residual stresses developed during welding.

Another disadvantage of the one piece welded torque tube assembly is that it creates an overall wheel rim assembly that tends to be extremely rigid. Obviously in the case of a wheel rim assembly that is used in the rear axle of the aforementioned large trucks, tremendous external and operating forces will be exerted on the wheel rim assembly during even normal truck operation and these forces are absorbed by the known torque assembly itself to some extent. Thus, not only must the torque tube assembly be able to absorb extremely large torsional forces but it must also bear at least some of the load bearing forces transmitted to the overall wheel rim assembly. In the known welded torque tube assemblies, distortion and even failure can occur under the great torsional and bending forces. Moreover, high stress concentrations generally occur in the welded areas of the tube assembly. Actual field experience has shown that fatigue failures have occurred in the weld areas.

Another major disadvantage in many of the known, welded torque tube assemblies arises from the necessity of providing access openings in the first cylindrical torque transmitting member (i.e. the barrel portion of the assembly) in order that an internal planetary gear bearing located within this member can be suitably mounted and adjusted for operation thereof. There is no other practical way of mounting this particular bearing where a one piece torque tube assembly is employed. The areas cut out of the first torque transmitting member to provide these openings develop high stress concentrations during use of the vehicle. Experience has again shown that fatigue failures occur in the areas of these openings.

Accordingly it is an object of the invention to provide a novel torque transmitting assembly for a wheel drive train which is better able to withstand great torsional and bending forces created during use of the wheel assembly.

It is a further object of the invention to provide such a torque transmitting assembly which has a longer operational life because of the use of gear means rather than welds to transmit torque between the parts of the assembly.

The present torque transmitting assembly overcomes many of the disadvantages of the prior art by providing a torque transmitting assembly that preferably consists of three separate parts rather than one and thus the assembly of the present invention is not rigid and does not require welding. Because of the flexibility of the connections between the three parts, there is no need for the assembly of the present invention to absorb large bending forces and the large torsional forces are transmitted between the members by means of a gear arrangement. Due to the gear arrangement of the three members which make up the assembly, large torsional forces are distributed evenly about the members, thus avoiding any stress concentration.

An additional object of the torque transmitting assembly of the present invention is to provide such an assembly which can be incorporated into existing wheel rim assemblies by simply substituting it for the original welded, one piece torque tube assembly.

SUMMARY OF THE INVENTION

Accordingly, the torque transmitting assembly of the present invention is for a wheel drive train and comprises a rotatable internal gear member having internal gear teeth and first annular gear means located radially outwardly from said internal gear teeth, said gear member adapted to engage driving gear means mounted within said gear member; a first cylindrical torque transmitting torsional member adapted to be rotated by said gear member, having primary annular gear means disposed about the interior of said first torsional member located substantially at one end thereof and adapted to engage said first gear means, and having secondary annular gear means disposed about the interior of said first torsional member, located substantially at the other end thereof, and axially spaced from said primary gear means; a second generally cylindrical torque transmitting torsional member having second annular gear means at only one end thereof in mating engagement with said secondary gear means, said second torsional member being rigidly connected at the other end thereof to a hub of a wheel, said second gear means being arranged on an outer surface of said second torsional member, an open annular space formed between the ends of said first torsional member, bearing means to support said driving means at one side thereof being disposed in said space, and whereby in operation, driving torque is transmitted from said driving gear means to said second torsional member via said first and primary gear means, said first torsional member, and said secondary and second gear means, said driving torque causing said second torsional member to rotate and thereby drive said wheel.

A preferred embodiment of the torque transmitting assembly of the invention has a first torque transmitting or torsional member which forms a substantially unbroken cylindrical surface in an area between the further or primary and secondary gear means with no access openings in this surface. Thus, with the construction of the present invention, there is no need for the access openings formed in the known first torque transmitting member (i.e. the barrel portion). Access can be gained to the planetary bearing to be arranged within the first torque transmitting member of the invention due to the fact that the first torque transmitting member need not be connected to the other members which make up the torque transmitting assembly until after the planetary bearing has been properly mounted and adjusted.

BRIEF DESCRIPTION OF THE DRAWINGS

A preferred embodiment of the torque transmitting assembly of the invention will now be described, by way of example, with reference to the accompanying drawings wherein.

DETAILED DESCRIPTION OF PREFERRED EMBODIMENTS

Figure 1:
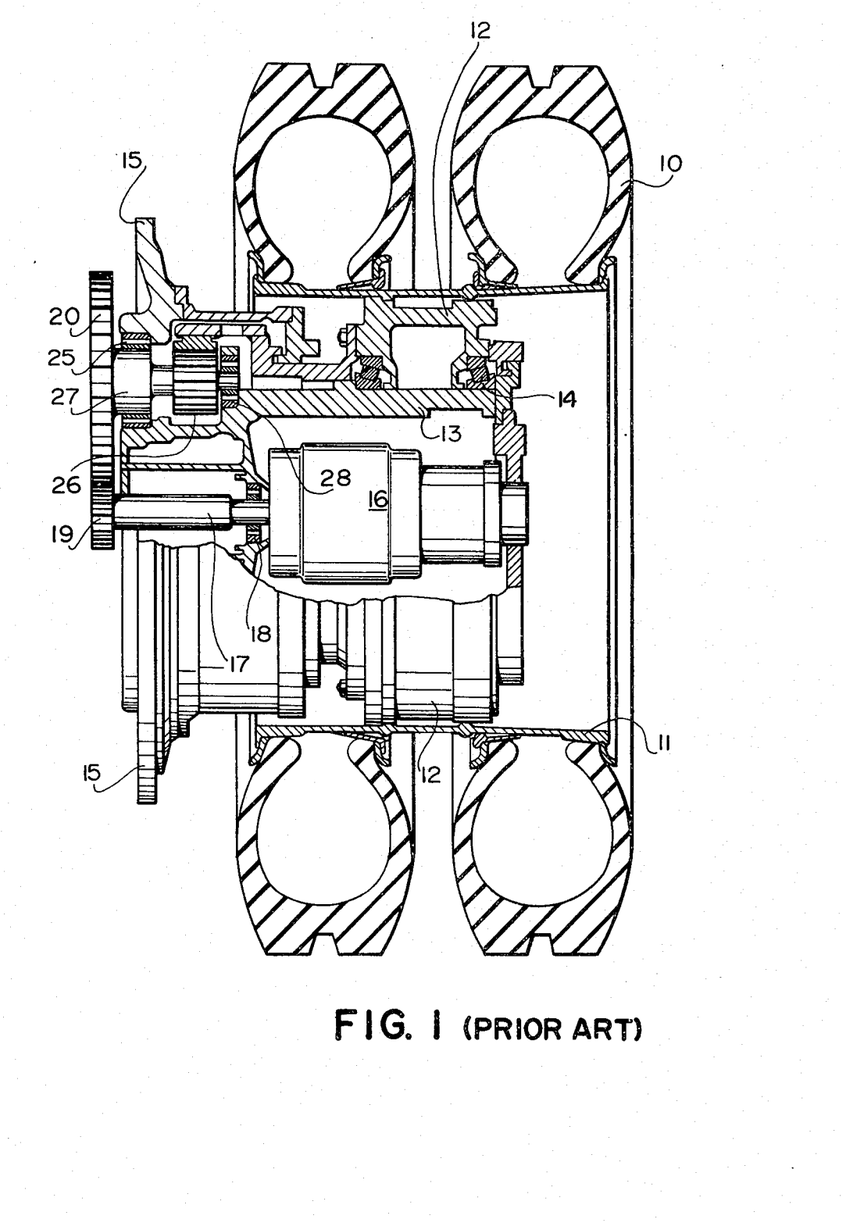
FIG. 1 is a cross sectional view of a known wheel rim assembly employing a welded torque tube assembly and having two tires mounted thereon.

In the drawings, FIG. 1 illustrates the construction of a known wheel hub assembly on which two rubber tires 10 have been mounted in dual fashion. Each rubber tire is mounted on a large, open ended, cylindrical rim member 11, the one member 11 extending between and through both tires. The rim member 11 is itself mounted on and supported by a further annular rim member 12 which in cross section is channel like in shape. The rim member 12 is rotatably mounted on a cylindrical housing 13 which forms the hub of the wheel. Wheel bearings 14 of known construction are arranged between the housing 13 and the rim member 12 to permit the rim member 12 to rotate easily on the housing. These wheel bearings 14 are retained in a conventional manner.

Figure 3:
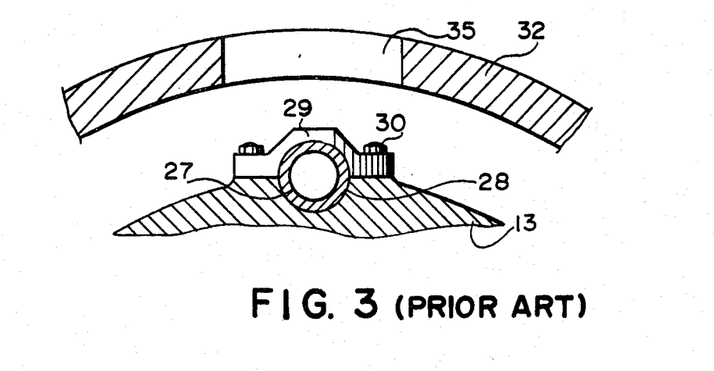
FIG. 3 is a sectional view along the line III—III of FIG. 2 showing the access opening in the first torque transmitting member of the welded torque tube assembly and how this opening facilitates adjustment of the bearing cap for the adjacent planetary gear.

The housing 13 is connected to the rest of the rear axle assembly of the vehicle by means of a flange portion 15 which is an integral portion of the housing 13. The portion 15 is connected to the inner portion of the rear axle by a large bolting pattern extending about its periphery. Mounted within the housing 13 is a suitable drive motor 16 which is preferably an electric or hydraulic motor. An output shaft 17 extends from the left hand end of the motor 16 as seen in FIG. 1 and, adjacent the motor 13, this shaft is supported by a roller bearing 18. Rigidly attached to the outer end of the output shaft is a pinion gear 19 which is located just out from the flange portion 15 of the housing. Three large, primary, planet gears 20, only one of which is shown in the drawings, are distributed evenly about the pinion gear 19. Thus, the three planet gears 20 are located 120° apart relative to the center axis of the pinion gear 19 and each planet gear is driven by the pinion gear 19. Each planet gear 20 is supported on the housing 13 on the side of the aforementioned rim members by a major bearing 25. Each bearing 25 is mounted in the housing 13 and radially inwardly from the flange portion 15. Each of the planet gears 20 is connected by means of a short shaft 27 to a planetary driving gear 26 which is a small pinion gear. A portion of the shaft 27 extends beyond the pinion gear 26 and is rotatably supported in a relatively small roller bearing 28. The manner in which this bearing 28 is mounted to the housing 13 is best seen from FIG. 3 of the drawings. A generally U-shaped bearing cap 29 is placed over the top of the bearing 28 by means of retaining bolts 30.

Figure 2:
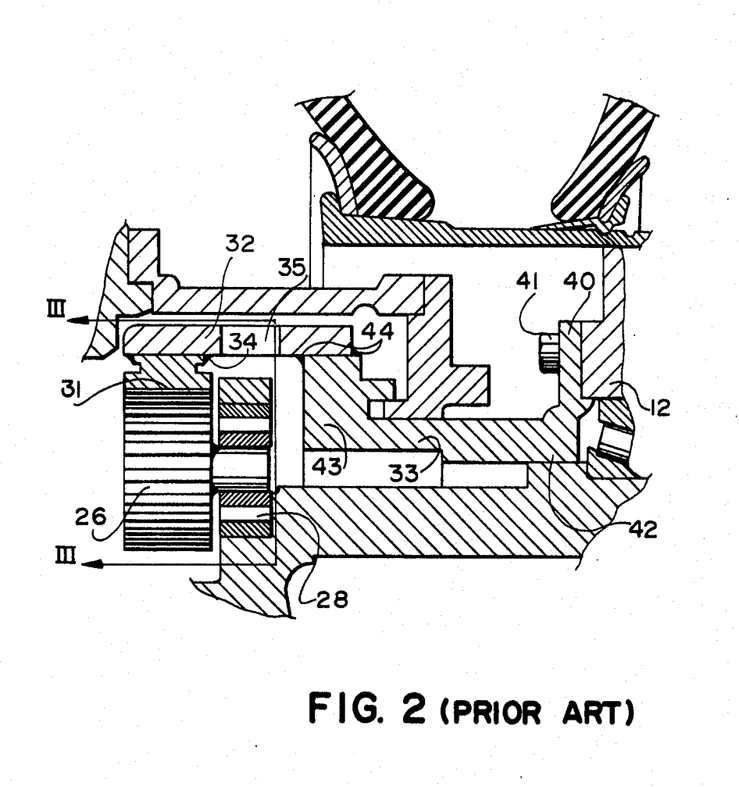
FIG. 2 is a detailed view of the circled portion of FIG. 1 showing the known welded torque tube assembly on an enlarged scale.

Turning now to FIG. 2 of the drawings, the known torque tube assembly consists of a ring gear 31 (herein termed the internal gear member), the barrel component (herein called the first torsional or torque transmitting member 32) and lastly the base component (herein termed the second torsional or torque transmitting member 33). All of these members which make up the torque tube assembly are large, annular members which extend about the output shaft 17 and the housing 13 and the cross section of the annular members is uniform throughout and can be seen from FIG. 2. The internal gear member 31 has an endless series of teeth extending about its circumference and each directed towards the center of the gear member. These teeth are adapted to engage the teeth of each of the three driving gears 26 so that as the gears rotate, the internal gear member 31 also rotates but at a much slower rate in terms of revolutions per minute. The first torque transmitting member is simply a cylindrical sleeve into which the gear 31 fits at one end of the member 32. The gear member 31 is rigidly connected to the inner surface at the one end of the member 32 by means of welds 34. In the known construction, a number of access openings 35 are distributed about the circumference of the member 32 and are located near the axial center of the member 32. As can be seen from FIG. 3 of the drawings, these access openings permit the mechanic assemblying the overall wheel structure to have access to the bearing 28 and bearing cap 29. This known construction thus permits the person assembling the wheel to first install the torque tube assembly over the housing 13 so as to mesh the driving gears 26 with the internal gear member of the torque tube assembly. It will be noted that this cannot be done with the bearing cap 29 installed as in FIG. 1. Once the three driving gears 26 have been properly meshed with the internal gear member, the bearing caps 29 can be attached by aligning the access openings 35 over the locations where the caps are to be attached. The cap then can simply be inserted through the opening 35 and connected.

The second torque transmitting member 33 is generally U-shaped in cross section and extends from the end of the first torque transmitting member 32 opposite the one end having the internal gear member 31 to the rim member 12 of the wheel assembly. The end of the second torque transmitting member 33 adjacent the rim member 12 is provided with means for rigidly connecting this end of member 33 to the rim member 12. Preferably these connection means include an annular flange 40 formed integrally on the end of the torque transmitting member 33. This flange 40 is rigidly connected to the adjacent side of rim member 12 by means of torque tube adapted bolts 41. The internal diameter of the first torque transmitting member 32 is somewhat greater than the external diameter of a cylindrical inner portion 42 of the second torque transmitting member 33. Therefore, the second member 33 has a further annular flange 43 extending radially outwardly relative to the center axis of the cylindrical inner portion 42 and located at the end of the portion 42 opposite the flange 40. The radially outer edge of the flange 43 is rigidly connected to one end of the first torque transmitting member 32 by means of the welds 44. It will thus be seen that the known torque tube is a welded assembly and, when installed, consists of a single, rigid annular member. Obviously, high torsional forces will be transmitted through this one piece member from the three driving gears 26 to the rim member 12.

It will be noted from FIG. 1 that when this known wheel assembly is in use, say on the rear axle of a large truck carrying a substantial load, a large bending load will be placed on that portion of the housing 13 which projects from the flange portion 15. This is due to the fact that the housing and surrounding wheel assembly are mounted in cantilever-fashion to the rear end of the truck. The large cantilever loads may of course be substantially increased where the truck is engaged in off-highway operations as is usually the case with this type of wheel structure. When the truck is inclined as when negotiating a steep hill, a very large proportion of the load and the weight of the chassis of the truck may be directed through one wheel and tire assembly. In such cases, extraordinary operating loads can be imposed on the housing 13. In addition to the large bending loads imposed on the housing 13 due to its cantilever type mounting, the reaction forces resulting from the torque being applied by the motor 16 to the planetary gear system must also be absorbed by the housing 13.

As stated, the massive torque output generated through the planetary gear system must be transferred through the torsion tube assembly to the rim member 12. When the strain on the torque tube assembly caused by these large torque outputs is combined with the small bending in the torque tube assembly caused by the bending of the adjacent housing due to the high centilever loads on the housing, known welded torque tube assemblies have been known to fail. In particular, failures have taken place at the welds 34 connecting the internal gear member 31 to the first torque transmitting member 32. Failures have also occurred in the second torque transmitting member 33 in the area of the access openings 35.

Figure 4:
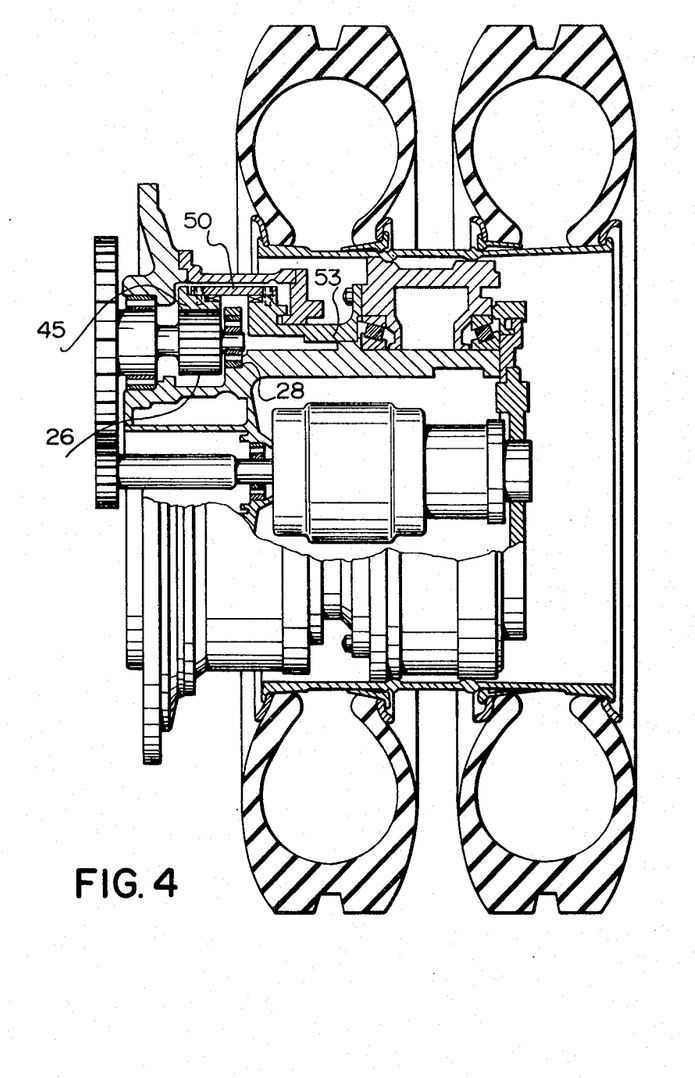
FIG. 4 is a cross sectional view similar to FIG. 1 except that the torque tube assembly is constructed according to the present invention.
Figure 5:
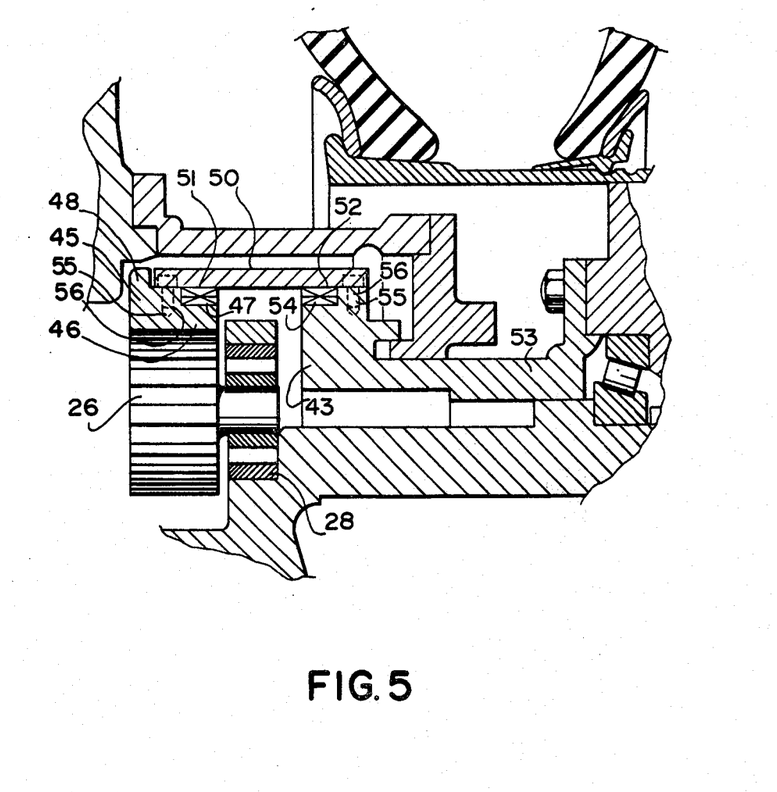
FIG. 5 is a detailed view of the circled portion of FIG. 4 showing the present torque tube assembly on an enlarged scale.

Turning now to FIGS. 4 and 5 of the drawing wherein the torque transmitting assembly of the present invention is shown, it will be noted that the construction of the overall wheel assembly is the same as that of the prior art shown in FIGS. 1 and 2 except for the construction of the torque tube assembly. The preferred torque tube assembly 45 of the invention comprises three separate components which are adapted to be detachably connected together. First of all, there is an internal gear member 46 which, like the ring gear 31 of the prior art, has internal gear teeth extending about its inner surface and engaging the three driving gears 26. However, gear member 46 is also provided with first annular gear means 47 located radially outwardly from the internal gear teeth. The gear means 47 consist of a series of gear teeth extending about the circumference of gear member 46 and located on one side of the outwardly facing surface of this gear member. In the preferred embodiment shown, the first gear means is an external gear having teeth extending radially outwardly relative to the centre axis of the internal gear member. In particular, the gear means 47 are located along that side of the radially outer surface of member 46 which is closest to the bearing 28. Also, the member 46 has a radially outwardly extending, annular flange 48. The flange 48 is located on the side of the member 46 furthest from the gear means 47. The first torque transmitting member 50 of the invention, like the known member 32, forms a cylindrical sleeve. However, the member 50 preferably has a substantially unbroken cylindrical surface and thus does not have the access openings 35 of the known member 32. This of course substantially increases the ability of the torque transmitting member 50 to absorb large torsional loads. The member 50 of the invention is also provided with primary annular gear means 51 for engaging the first gear means 47 and a secondary annular gear means 52. Each of these primary and secondary gear means consists of an encless series of teeth arranged about the interior of the member 50 near one end thereof. The aforementioned flange 48 assists in the axial alignment of the member 50 during the assembly thereof. Again, in this preferred embodiment each of the primary and secondary gear means is an internal gear having teeth extending radially inwardly.

The second torque transmitting member 53 is of basically the same construction as the known member 33 except that the annular flange 43 is preferably provided with second annular gear means 54 which is adapted to engage the secondary gear means 52. The second gear means 54 is similar to the first gear means 47 and consists of an endless series of teeth extending about the circumference of the member 53. In the preferred embodiment shown, the teeth of the second gear means extend radially outwardly. The means for detachably connecting the first torque transmitting member 50 to the internal gear member 46 and to the second torque transmitting member 53 are such that, when the wheel is being driven by the motor 16 and torque is being applied by the three drive gears 26 to the internal gear member 46, the driving torque is transmitted from the member 46 to the first torque transmitting member 50 via the first gear means 47 and the primary gear means 51. Thus, the torque is transferred in a positive, mechanical manner which avoids undue stressing of the members at any particular point because the torsional load is partially borne by each of the teeth of the gear means. Similarly, the torsional loads in the first member 50 are transferred to the second torque transmitting member 53 via the secondary gear means 52 and the second gear means 54. Again, this construction permits the torque to be transferred evenly between the members without undue local stressing.

As stated, means are preferably provided for detachably connecting the first torque transmitting member 50 to both the internal gear member 46 and the second torque transmitting member 53. Preferably, threaded bolt holes are formed in the outer surface of the internal gear member 46 and the radially outer surface of the annular flange 43. These bolt holes 55 are distributed about the circumference of the members 46 and 53. In the case of internal gear member 46, the holes 55 are formed between the first gear means 47 and the annular flange 48, while in the case of the torque transmitting member 53, the holes 55 are formed along that side of the outer surface of flange 43 which is opposite the second gear means 54. In order to accommodate the heads of the bolts 56 which threadingly engage the bolt holes 55, non-threaded holes (not shown) having a diameter slightly greater than that of the heads of these bolts are drilled in the first torque transmitting member 50. The number and position of these non-threaded holes corresponds to the number and position of the holes 55. It should perhaps also be noted that the center axes of the holes 55 and the holes in the member 50 extend in the radial direction relative to the axis of the torque transmitting assembly. In assembling this type of wheel structure prior to placing the structure onto the central portion of the rear axle of the truck or vehicle, the center axis of the housing 13 is arranged in the vertical position with the flange portion 15 arranged at the bottom. With the known welded torque tube assembly, the whole welded-together assembly is slid down over the housing 13 until it arrives at the position shown in FIG. 1 relative to the housing. Thus, as stated previously, it is impossible to mesh the ring gear 31 with the three driving gears 26 unless the bearing cap 29 has been removed prior to the installation of the torque tube assembly.

The torque transmitting assembly of the present invention is assembled by placing the separate internal gear member 46 in proper engagement with the three driving gears 26 (i.e. in the position shown in FIG. 5) when the gear member 46 is in place, the bearing cap 29 can then be attached by means of the retaining bolts 30. Clearly, there is no need for the access openings 35 since the barrel component or first torque transmitting member 50 has not yet been put in place. After the bearing cap has been attached and the end play of the bearings 28 suitably determined, the member 50 can be attached to the internal gear member 46 by sliding it over the housing 13 and over the gear member 46 until the teeth of the primary gear means engage the teeth of the first gear means 47. The bolts 56 are then screwed into their holes 55 so that axial displacement of the gear member 46 with respect to the torque transmitting member 50 is prevented. It should be understood however that the bolts 56 do not prevent a slight relative circumferential movement between the torque transmitting member 50 and the internal gear member 46 as this movement may be necessary to permit the first gear means 47 to fully engage the primary gear means 51. As stated the bolts 56 have a head diameter which is somewhat less than the diameter of the holes in the torque transmitting member 50 through which they are inserted for threading into the holes 55. This slight difference in diameter permits the first torque transmitting member 50 to rotate a sufficient distance relative to the internal gear member 46 to enable the teeth of the first gear means 47 to fully engage the teeth of the primary gear means 51. Thus, any further relative rotation between the internal gear member 46 and the torque transmitting member 50 is prevented by the teeth of these gear means.

After the torque transmitting member 50 has been properly attached, the second torque transmitting member 53 is slid over the housing 13 and the flange 43 thereof is shoved into the first torque transmitting member 50 until the second gear means 54 engage the secondary gear means 52 properly. The bolts 56 are then screwed into the holes 55 in the flange 43 to prevent relative axial movement between the member 50 and the member 53. Again, the diameter of the heads of these bolts 56 is slightly less than the diameter of the holes in the torque transmitting member 50 through which they are inserted for screwing into the holes 55. Thus, sufficient relative circumferential movement between the member 50 and the member 53 is permitted to enable the teeth of the secondary gear means 52 to fully engage the teeth of the second gear means 54. The loose fit between all of the heads of the bolts 56 and their surrounding holes in the torque transmitting member 50 has the further advantage of preventing any bending stresses in the three components of the torque transmitting assembly when bending stresses are set up in the housing 13 during wheel use. The lack of bending stresses is of course due to the fact that the bolts 56 and the first, primary, secondary and second gear means do not act to prevent slight relative bending movement between the components of the torque transmitting assembly.

From the above description, it will be observed that the torque from the motor 16 and the planetary gear system is effectively transferred to the rim member 12 through the torque transmitting assembly of the invention. The former need for the weld 34 and 44 has been avoided by the use of the various annular gear means. Because the tubular member 50 of the invention is not rigidly fixed to the internal gear member 46 and to the member 55 such as by the welds used formerly, the assembly of the present invention might be termed a "floating" torque tube assembly since the member 50 floats to a certain extent on the gear member 46 and torque transmitting member 53. Thus, the member 50 can move axially a slight distance due to the loose fit between the heads of the bolts 56 and the surrounding holes in the torque transmitting member 50 and member 50 is free to move slightly in the circumferential direction relative to the both the internal gear member 46 and the member 53, again due to the loose fit around the heads of the bolts 56.

The floating construction of the torque transmitting assembly of the present invention has the further advantage of simplifying and permitting alignment of the torque tube assembly within the overall wheel assembly and eliminating the former need for special alignment and fitting procedures during the assembly operation.

It will be readily understood by those skilled in the present art and particularly in the art of constructing assemblies of gears that the teeth of the first, primary, secondary and second gear means of the invention need not necessarily extend in the radial direction as shown in the drawings. For example these teeth can extend in the axial direction relative to the centre axis of the first torque transmitting member. The teeth of the first and secondary gear means can for instance extend axially towards the second torque transmitting member. In this case the teeth of the secondary gear means can be formed on an annular flange extending about the interior of the first torque transmitting member. Then the teeth of the primary and second gear means would extend axially towards the end having the internal gear member.

Alternatively the first, primary, secondary and second gear means could each consist of a bevel-type gear with teeth arranged at a 45° angle, for example, to the centre axis of the first torque transmitting member.

While the torque transmitting assembly of the invention has been described in relation to a known electric drive wheel construction, it should of course be understood and appreciated that the torque tube assembly of the invention can be adapted to other forms of wheels driven by other means such as by hydraulic or mechanical means.

What I claim as my invention is:

1. A torque transmitting assembly for a wheel drive train comprising a rotatable internal gear member having internal gear teeth and first annular gear means located radially outwardly from said internal gear teeth, said gear member adapted to engage driving gear means mounted within said gear member; a first cylindrical torque transmitting torsional member adapted to be rotated by said gear member, having primary annular gear means disposed about the interior of said first torsional member located substantially at one end thereof and adapted to engage said first gear means, and having secondary annular gear means disposed about the interior of said first torsional member, located substantially at the other end thereof, and axially spaced from said primary gear means; a second generally cylindrical torque transmitting torsional member having second annular gear means at only one end thereof in mating engagement with said secondary gear means, said second torsional member being rigidly connected at the other end thereof to a hub of a wheel, said second annular gear means being arranged on an outer surface of said second torsional member, an open annular space formed between the ends of said first torsional member, bearing means to support said driving means at one side thereof being disposed in said space, and whereby in operation, driving torque is transmitted from said driving gear means to said second torsional member via said first and primary gear means, said first torsional member, and said secondary and second gear means, said driving torque causing said second torsional member to rotate and thereby drive said wheel.

2. A torque transmitting assembly according to claim 1 wherein said first torsional member forms a substantially unbroken cylindrical surface in an area between said primary and secondary gear means with no access openings in the cylindrical surface.

3. A torque transmitting assembly according to claim 2 including means for detachably connecting said first torsional member to said internal gear member and to said second torsional member respectively, and wherein said first torsional member is detachably connected to said internal gear member and said second torsional member is detachably connected to said first torsional member by said connection means.

4. A torque transmitting assembly according to claim 1 wherein said second torsional member includes means for rigidly connecting one end of the second torsional member to a wheel rim member.

5. A torque transmitting assembly according to claim 4 wherein said connection means includes an annular flange formed integrally on said one end of said second torsional member.

6. A torque transmitting assembly according to claim 1 including means for detachably connecting said first torsional member to said internal gear member and to said second torsional member respectively, and wherein said connection means includes bolt holes formed in said first and second torsional members and in said internal gear member, the center axes of said holes extending in the radial direction relative to the axis of said internal gear member.

7. A torque transmitting assembly according to claim 6 wherein said connection means includes bolts adapted for use in said bolt holes and said first torsional member is detachably connected to said internal gear member and to said second torsional member.

8. A torque transmitting assembly according to claim 1 wherein said internal gear member and said first and second torsional members are detachably connected together and are co-axial.

9. A torque transmitting assembly according to claim 8 wherein the internal diameter of said first torsional member is greater than the external diameter of a cylindrical inner portion of said second torsional member, said second torsional member has an annular flange extending radially outwardly relative to the centre axis of said cylindrical inner portion, and said first torsional member is detachably connected to the radially outer edge of said annular flange.

10. A torque transmitting assembly according to claim 9 wherein said second gear means is formed integrally on said annular flange.

11. A torque transmitting assembly according to claim 8 wherein said first gear means is formed integrally on the radially outer side of said internal gear member and the bolt holes are formed on the radially outer surface of said internal gear member.

12. A torque transmitting assembly according to claim 6 wherein the internal diameter of said first torsional member is greater than the external diameter of a cylindrical inner portion of said second torsional member, said second torsional member has an annular flange extending radially outwardly relative to the centre axis of said cylindrical inner portion, said second gear means is formed integrally on or adjacent the radially outer side of said annular flange and the bolt holes are formed on the outer edge of said annular flange.

13. A torque transmitting assembly according to claim 1 wherein said first and second torsional members are adapted for mounting around a support housing containing a drive motor.

14. A wheel assembly comprising a substantially cylindrical housing adapted to mount a wheel driving motor therein, planetary gear means adapted to be driven by said motor, means for rotatably mounting said planetary gear means, a torque transmitting assembly according to claim 1, said planetary gear means including driving gear means adapted to engage said internal gear member internally, an annular rim member, and means for rotatably mounting said rim member around said cylindrical housing.

15. A wheel assembly according to claim 14 wherein said first torsional member froms a substantially unbroken cylindrical surface in an area between said first and second internal gear means with no access openings in the cylindrical surface.

16. A wheel assembly according to claim 15 including means for detachably connecting said first torsional member to said internal gear member and to said second torsional member respectively.

17. A wheel assembly according to claim 16 wherein said connection means including bolt holes formed in said first and second torsional members and in said internal gear member, the centre axes of said holes extending in the radial direction relative to the axis of said internal gear member.

18. A wheel assembly according to claim 15, wherein said internal gear member and said first and second torsional members are detachably connected together and are co-axial.

* * * * *